United States Patent [19]
Cordova

[11] Patent Number: 5,767,970
[45] Date of Patent: Jun. 16, 1998

[54] BONDED FIBER OPTIC GYRO SENSOR COIL INCLUDING VOIDS

[75] Inventor: Amado Cordova, West Hills, Calif.

[73] Assignee: Litton Systems, Inc., Woodland Hills, Calif.

[21] Appl. No.: 661,166

[22] Filed: Jun. 10, 1996

[51] Int. Cl.$^6$ ........................... G01C 19/72
[52] U.S. Cl. ........................... 356/350
[58] Field of Search ............ 356/350; 242/7.01; 385/128

[56] References Cited

U.S. PATENT DOCUMENTS 4,856,900  8/1989  Ivancevic ..................... 356/350

FOREIGN PATENT DOCUMENTS 0385682  9/1990  European Pat. Off. ............ 356/350
0429238  5/1991  European Pat. Off. ............ 356/350

Primary Examiner—Samuel A. Turner
Attorney, Agent, or Firm—Elliott N. Kramsky

[57] ABSTRACT

A sensor coil for a fiber optic gyroscope. A continuous optical fiber is coated with bonding material of predetermined composition such as a thermoplastic material that exhibits a bond strength of at least 100 p.s.i. in tension, equivalent to at least 40 p.s.i. in shear. The coated fiber is arranged into a predetermined winding pattern whereby contacting portions of adjacent coil turns are bonded to one another. Void spaces between contacting portions of bonded turns reduce the volume of bonding material employed (as opposed to a filled potted sensor coil). The coil does not experience the differential in expansion along the axial and radial directions to the degree that has, for example, required the use of single flanged spools in the prior art. Its use with dual-flanged spools permits mounting arrangements that promote coil stiffness, thereby enhancing gyro performance in the presence of vibration.

9 Claims, 1 Drawing Sheet

BONDED FIBER OPTIC GYRO SENSOR COIL INCLUDING VOIDS

BACKGROUND

1. Field of the Invention

The present invention relates to fiber optic gyroscopes. More particularly, this invention pertains to a sensor coil that is less sensitive to the stiffness and thermal properties of bonding agents than potted designs.

2. Description of the Prior Art

An interferometric fiber optic gyroscope comprises the following main components: (1) a light source, (2) two beamsplitters (fiber optic directional coupler and/or integrated-optics Y-junctions) to satisfy the requirement of a "minimum reciprocal configuration" (S. Ezekiel and M. J. Arditty, *Fiber Optic Rotation Sensors* New York. Springer-Verlag p. 2–26 1982), (3) a fiber sensing optic coil made of either polarization maintaining (PM) fiber or made of low-birefringence (standard telecommunications) fiber, (4) a polarizer (and sometimes one or more depolarizers), and (5) a detector. Light from the light source is split by the loop beamsplitter into copropagating and counterpropagating waves travelling in the sensing coil. The associated electronics measures the phase relationship between the two interfering, counterpropagating beams of light that emerge from opposite ends of the coil. The difference between the phase shifts experienced by the two beams is proportional to the rate of rotation of the platform to which the instrument is fixed, due to the well-known Sagnac effect.

Environmental factors can affect the measured phase shift difference between the counterpropagating beams, thereby introducing a bias error. Such environmental factors include variables such as temperature, vibration (acoustical and mechanical) and magnetic fields. In general, such factors are both time-varying and unevenly distributed throughout the coil. These environmental factors induce variations in the optical light path that each counterpropagating wave encounters as it travels through the coil. The phase shifts induced upon the two waves are unequal, producing a net undesirable phase shift which is indistinguishable from the rotation-induced signal.

One approach to attain a reduction of sensitivities arising from environmental factors has involved the use of various symmetric coil winding configurations. In such coils, the windings are arranged so that the geometrical center of the coil is located at the innermost layer while the two ends of the coil are located at the outermost layers.

N. Frigo has proposed the use of particular winding patterns to compensate for non-reciprocities in "Compensation of Linear Sources of Non-Reciprocity in Sagnac Interferometers". *Fiber Optics and Laser Sensors I*, Proc. SPIE Vol. 412 p. 268 (1983). Furthermore, U.S. Pat. No. 4,793,708 of Bednarz entitled "Fiber Optic Sensing Coil" teaches a symmetric fiber optic sensing coil formed by dualpole or quadrupole winding. The coils described in that patent exhibit enhanced performance over the conventional helix-type winding.

U.S. Pat. No. 4,856,900 of Ivancevic entitled "Quadrupole-Wound Fiber Optic Sensing Coil and Method of Manufacture Thereof" teaches an improved quadrupole-wound coil in which fiber pinching and microbends due to the presence of pop-up fiber segments adjacent the end flanges are overcome by replacing such pop-up segments with concentrically-wound walls of turns for climbing between connecting layers. Both of the aforementioned United States patents are the property of the assignee herein.

While appropriate coil winding techniques minimize some of the bias errors found in the output of a fiber optic gyro, they are not capable of eliminating all of such biases. In particular, the design of the gyro sensor coil can impact the gyro's random walk, bias stability, bias temperature sensitivity, bias temperature-ramp sensitivity, bias vibration sensitivity, bias magnetic sensitivity, scale factor temperature sensitivity and input axis temperature sensitivity.

The relatively-high proportion of sensor coil volume consumed by the adhesive material of a potted sensor coil (about twenty-five percent) means that the physical parameters of the potting material play a large role in determining gyro performance. FIG. 1 is a cross sectional view of a portion of such a potted sensor coil. As can be seen, the turns of a continuous optical fiber 10 are encapsulated within a surrounding matrix of potting material 12, forming an integral structure therewith. It has been well-recognized that potting is advantageous for facilitating the precision of coil winding. Furthermore, it is disclosed in U.S. patent Ser. No. 5,371,593 of co-inventors Amado Cordova, Donald J. Bilinski, Samuel N. Fersht. Glenn M. Surabian, John D. Wilde and Paul A. Hinman entitled "Sensor Coil For Low Bias Fiber Optic Gyroscope", that the composition of the potting material can have a significant impact upon the vibration bias sensitivity of the fiber optic gyro as a result of changes in fiber length and refractive index brought about by vibration dynamic strains.

The referenced United States patent discloses a sensor coil whose design incorporates a number of features for minimizing the aforesaid environmental factors. Among the issues identified and addressed in that patent is the existence of a relationship between the modulus of elasticity of the potting material and vibration-induced bias. Generally, gyro performance (in terms of vibration) is significantly improved by potting material possessing a high modulus of elasticity (Young's modulus). The modulus should not, however, be so high as to produce other problems related to gyro operation at temperatures significantly removed from the curing temperature of the potting material. Such problems include temperature related coil cracking, h-parameter (polarization cross-coupling) degradation of coils fabricated of PM-fiber, and large bias temperature-sensitivity. Pending U.S. patent application Ser. No. 08/266,993 of Amado Cordova and Glenn M. Surabian, property of the assignee herein, teaches the selection of polymer potting materials based, in part, upon the relationship between the glass transition temperature of a candidate material and the operational temperature range of the gyro.

Pending U.S. patent application Ser. Nos. 08/526,725 of Ralph A. Patterson and 08/299,585 of Donald J. Bilinski, Gene H. Chin, Amado Cordova and Samuel N. Fersht. each property of the assignee herein, disclose spools for gyro sensor coils designed to overcome other problems associated with the properties of adhesive materials when used to encapsulate coils. A substantial differential is generally observed to exist between the radial and axial thermal expansion characteristics of an encapsulated potted sensor coil. Typically, the radial thermal expansion coefficient of a potted sensor coil is less than 10 parts per million (ppm) per degree Centigrade (deg C.), whereas the axial thermal expansion coefficient of a potted coil is typically larger than 200 ppm per deg C. This large anisotropy of the thermo-mechanical properties of a potted coil results from the large differences that exist between the thermal expansion properties of the glass fiber (cladding and core) and the surrounding polymers (in particular, the potting material) and the fact that the fiber turns are fully encapsulated by the potting adhesive, leaving no void spaces therebetween. The net result is that radial expansion of the potted coil is fully determined by the low-expansion, stiff glass fiber turns whereas the axial expansion is determined by the high-expansion, softer potting material.

Each of the above-mentioned pending applications discloses a spool or coil mount that includes a single support flange. This is in contrast to spools employing paired end flanges. The single flange arrangements permit the potted coil to be axially unconstrained, thereby preventing excessive stress on the optical fiber, and consequent detrimental effects on gyro bias performance in response to temperature changes. The potted coil would otherwise be prone to such excessive stress due to the greater degree of expansion of the filled coil than of the spool in the axial direction. On the other hand, coil mounts or spools of the type that employ a pair of end flanges (necessarily constraining the axial dimension of the coil) add highly desirable coil stiffness that can significantly reduce the gyro vibration sensitivity. Therefore, a reduction in the coil's thermally-induced axial expansion will increase the feasibility of spool mounts that include paired end flanges, leading to improved gyro performance, particularly with respect to vibration sensitivity.

SUMMARY OF THE INVENTION

The foregoing and additional shortcomings and disadvantages of the prior art are addressed by the present invention that provides, in a first aspect, a sensor coil for a fiber optic gyroscope. Such a coil includes a continuous optical fiber. The fiber is arranged into a plurality of concentric cylindrical layers with adjacent layers contacting one another. Each of the layers comprises a plurality of turns arranged in a predetermined winding pattern with adjacent turns contacting one another. The optical fiber is coated with material of predetermined composition for bonding adjacent turns and layers to one another at points of contact.

In a second aspect, the invention presents a sensor coil for a fiber optic gyroscope that includes a continuous optical fiber coated with a layer of bonding material and arranged onto a support spool in a plurality of contacting, concentric cylindrical layers of turns. Each turn is arranged into a predetermined winding pattern with adjacent turns contacting one another so that turns are bonded to one another at the points of contact and void spaces remain therebetween.

In a third aspect, the invention provides a method for forming a sensor coil for a fiber optic gyroscope. Such method is begun by coating an optical fiber with a layer of predetermined bonding material. The fiber is then wound into a predetermined pattern upon a spool and cured whereby the contacting portions of turns of the wound fiber are bonded to one another and void spaces remain therebetween.

The preceding and other features and advantages of the invention will become further apparent from the detailed description that follows. Such description is accompanied by a set of drawing figures. Numerals of the drawing figures, corresponding to those of the written text, point to the various features of this invention with like numerals referring to like features throughout.

DETAILED DESCRIPTION

Figure 1:
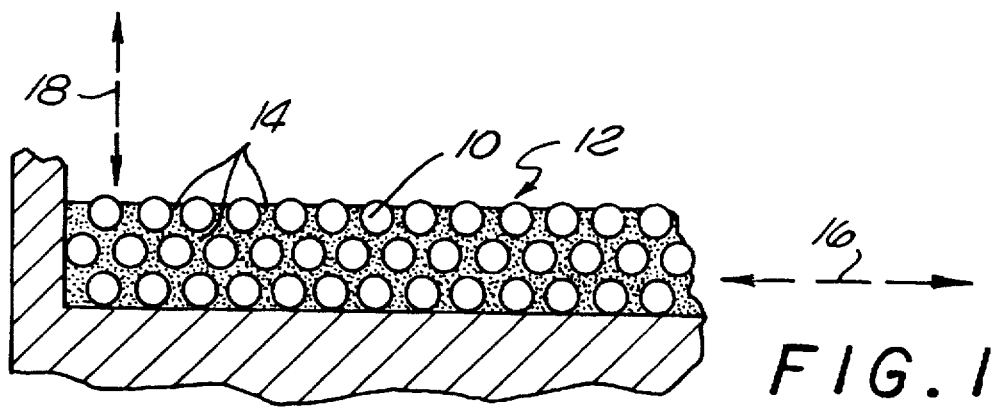
FIG. 1 is a cross-sectional view of a representative portion of the layered windings of a potted sensor coil in accordance with the prior art wherein the windings thereof are encapsulated within an adhesive potting material to form a filled structure.
Figure 2:
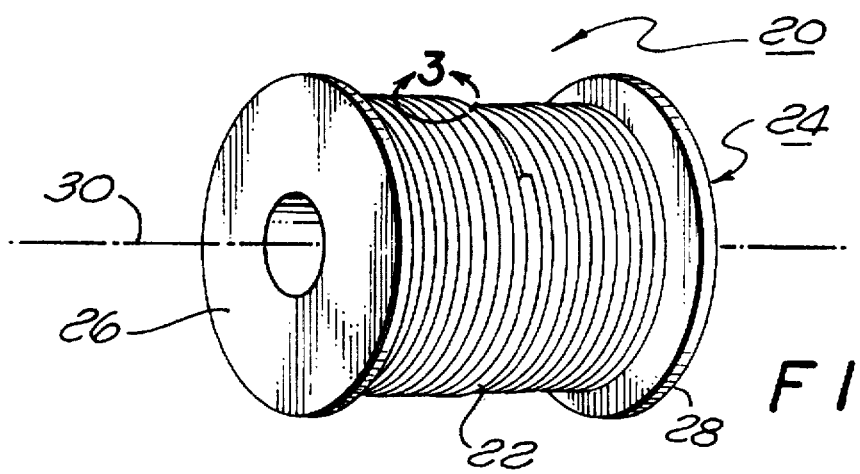
FIG. 2 is a perspective view of a sensor coil for a fiber optic gyroscope in accordance with the invention mounted to a spool of the type that includes paired end flanges.

Turning to the drawings, FIG. 2 is a perspective view of a sensor coil 20 in accordance with the present invention. As mentioned earlier, the sensor coil 20 provides a critical element of a fiber optic gyro. In use, it is rigidly fixed to a navigation system platform, serving to sense platform rotation rate. The rotation rate information is employed by an aircraft flight computer to perform an analytical "leveling" of the navigation platform. In this way, the outputs of the I.N.S. accelerometers are converted to true measures of velocity and distance along the inertial axes.

The sensor coil 20 comprises a continuous optical fiber 22 that is wound upon a supportive spool 24 and serves as an optical guide for receiving a counterpropagating beam pair emitted from a common light source (not shown). The supportive spool 24 of FIG. 2 preferably includes a pair of end flanges 26 and 28 as shown. Unlike potted sensor coil structures in which an adhesive material encapsulates and fills the voids around the wound fiber, the use of bonding material is sufficiently restricted to lessen the impact of the physical properties of the material upon the performance of the wound coil. As one consequence, the coil 20 will not experience differential expansions between axial and radial directions of such a magnitude as to require the use of single flange spool designs. As will be seen below, the coil of the present invention is suitable for use with dual-flanged mounting spools that add desirable stiffness under vibration.

Figure 3:
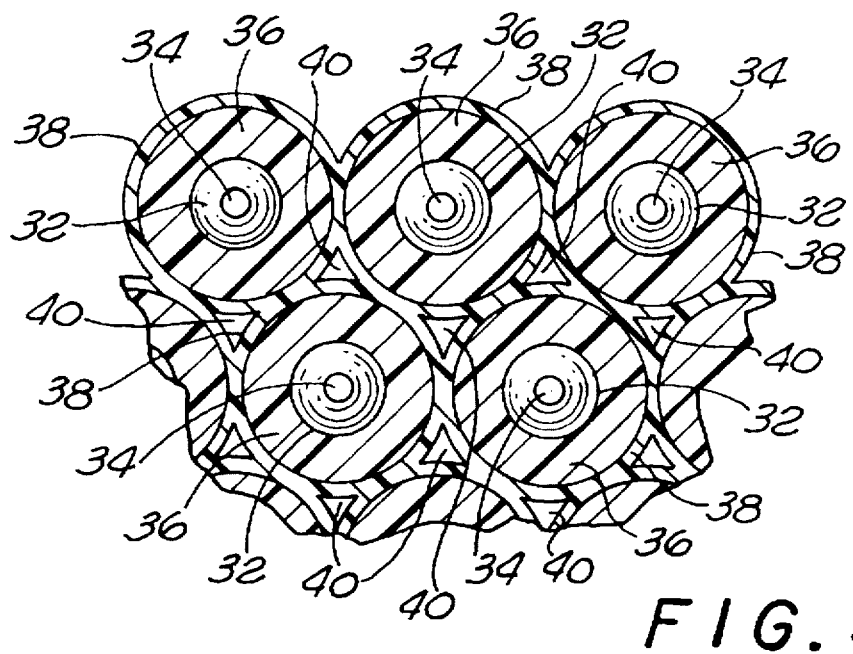
FIG. 3 is a cross sectional view of a portion of a fiber optic sensor coil in accordance with the invention in which adjacent turns are coated with bonding material and fused to one another at points of mutual contact.

FIG. 3 is a cross-sectional view of a portion (actually a limited number of adjacent turns of the optical fiber 22) of the fiber optic sensor coil 20 of the invention taken at the section 3 of FIG. 2. As shown, the continuous fiber 22 includes a central cladding 32 of glass. Typically the cladding 32 is between 80 and 125 microns in diameter with a central core 34 of higher index of refraction glass. Representative core diameters range from 5 to 8 microns. An outer jacket 36 of polymer composition protects the glass cladding 34. The jacket 36 may consist of overlying resin coatings, for example, an inner coating of a resin of relatively low-Young's modulus and an outer coating of a resin of relatively high Young's modulus. Typically, each of the inner and outer resin coatings is about 20 microns thick. The jacket 36 may also consist of a single resin coating of an intermediate value of Young's modulus.

Finite element modelling (FEM) of the fiber gyro sensor coil has been employed to calculate the maximum environmental stresses experienced by the different coil constituents. In particular, FEM has determined the maximum radial stress (perpendicular to the fiber axis) that tends to separate the potting or bonding material from the fiber jacket. Such maximum de-bonding stress has been found to be about 100 pounds per square inch (p.s.i) for the high-accuracy coils of the aforementioned patent applications of Patterson and of Bilinski et al. Consequently, the minimum bond strength in tension of the bonding material of the present invention to itself and to the fiber jacket must be at least 100 p.s.i. Measurements of bond strength in tension have been performed employing the American Standard Test Method (ASTM) number D897 "Tensile Properties of Adhesive Bonds." In such method, thin films (about 100 to 200 microns thick) of the fiber jacket material are sandwiched between thin films of the potting or bonding material (in liquid or uncured form) and metallic samples fabricated according to the ASTM. The potting or bonding material is then cured. "Sandwich" samples are then pulled in tension. The force required to break the bond is recorded and the bond strength in tension is given as the ratio of such force to contact area. It is important that failure (or breakage of the bond) occurs at the potting or bonding material-to-fiber jacket film interface. It was found experimentally that a bond strength, in tension, of the potting or bonding material to itself and to the fiber jacket film of 100 p.s.i or more is adequate for fiber gyro coils. An alternate method to measure bond strength is in shear rather than tension, utilizing a short segment of optical fiber rather than a thin film of the fiber jacket material. In the alternate method, the fiber is embedded in the potting or bonding material and sandwiched between pieces of quartz. The preferred fiber length is ½ inch. After curing, the fiber is pulled in the direction of its axis while the pieces of quartz are held until the bond at the potting or bonding material-to-fiber jacket interface breaks. The bond strength in shear is given by the breaking force divided by the lateral contact area of the fiber (i.e., fiber length times fiber diameter times $\pi$). It was found experimentally that a bond strength in shear of the potting or bonding material to itself and to the fiber jacket of 40 p.s.i or more is adequate for fiber gyro coils. Thus 100 p.s.i. or more in tension is equivalent to 40 p.s.i. or more in shear for the purposes of this invention.

The exterior of the optical fiber 22 is coated with a layer 38 of material for bonding the turns of the coil 20 in accordance with the present invention. The layer 38, preferably less than 10 microns in thickness, is fabricated of material selected so that, when cured, a bond strength, in tension, of at least 100 p.s.i. (alternatively at least 40 p.s.i. in shear) is provided between contacting turns. An example of an appropriate bonding material for forming the coating layer 38 is the thermoplastic polymer coating commercially available under the trademark KYNAR or PVDF (polyvinylidene fluoride) from Polymicro Technologies Inc. of Phoenix, Ariz. The optical fiber may be coated by a dip-coating process (solution coating) or an extrusion process (hot melt coating). Dip-coating permits excellent dimensional control and good bonding to the fiber acrylate material. Once the fiber gyro coil is wound, the bonding material is activated to bond adjacent fiber turns. KYNAR or PVDF can be activated by heating at about 160 deg C. for a limited period of time to avoid compromising optical fiber strength. Another appropriate bonding material is the thermoplastic material commercially available under the trademark BUTVAR (polyvinyl butyral) from Shawinigan Ltd. of London, England. This resin is widely used as a wire enamel to bond electronic coils and bobbins and is produced by the reaction between polyvinyl alcohol and aldehydes. A third example of an appropriate bonding material for forming the layer 38 is the thermoplastic wire enamel commercially available under protect designation VG-8637 from Supreme Resources, Inc. of New York, N.Y. This material, based on an epoxy resin solution in a conventional solvent system (cresylic acid and aromatic hydrocarbon), can withstand high baking temperatures without loss of bonding properties while maintaining excellent coatability over a wide bake range. It can be activated (cured) by either heat or solvent. Temperatures of 150 degrees Centigrade or more are suggested for thermal bonding while the recommended solvents include acetone and methyl ethyl ketone.

The concept of a bonded, as opposed to an encapsulated potted sensor coil, frees the designer to a large extent from design considerations based upon and substantially limited by the thermal properties of the adhesive potting material. As mentioned above, such material parameters as Young's modulus, glass transition temperature and coefficient of thermal expansion of the potting material have so significantly affected gyro performance in encapsulated coil gyros as to virtually dictate the use of a particular potting material. Whereas between 25 and 30 percent of the volume of an encapsulated (i.e. filled) potted coil comprises the adhesive material, a coil in accordance with the invention formed of a wound continuous optical fiber with a coating thickness of 10 microns or less of appropriate bonding material comprises approximately 5 to 10 percent bonding material with the remaining 15 to 25 percent of coil volume consisting of inter-turn void spaces 40.

The reduction in the amount of bonding material employed necessarily reduces the impact of the thermal and mechanical properties of the bonding material upon gyro performance and consequently reduces the effect of the bonding material upon coil, spool and mount designs. The void spaces 40 of the "honeycombed" cross section of the sensor coil further reduce the effect of the thermal characteristics of the bonding material upon gyro performance. Such void spaces 40 provide a built-in "margin of error" by creating areas into which the bonding material 38 as well as the jacket 36 may expand in the presence of coil heating without excessively increasing the size (principally, the axial dimension) of the sensor coil. Thus, the sensor coil 20 of the invention is physically quite stable, as is the gyro performance, in the presence of thermal cycling.

The sensor coil of the invention may be formed by first drawing the optical fiber through a bath of appropriate bonding material such as the above-described thermoplastics (KYNAR, BUTVAR or VG-8637). After removal from the bath, the coated fiber is then preferably advanced onto a pair of spools in equal lengths that act as supply spools for a quadrupole winding process. As mentioned earlier, such a winding pattern minimizes the amount of Shupe effect-induced bias. Heat may be applied to the coil windings for activating the bonding material either as the coated optical fiber is being wound upon a take-up spool or after the completion of winding. Upon activation of the bonding material, turns of the optical fiber are fused to one another at points of mutual contact. As noted earlier, the particular bonding materials referenced above are heat-curable at 150 to 160 degrees Centigrade. However, by extending the duration of the heating process, the requisite bonding strength may be obtained at 120 degrees Centigrade. Such lower curing temperature is preferred in view of the thermal characteristics of the polymer material that serves as an outer protective jacket of the optical fiber.

By applying the activating heat as the coil is wound, one may fix the locations of turns with great precision. This avoids the problem of "slumping" that is commonly observed in wound coils. Slumping refers to the tendency of some turns to migrate from a particular layer toward underlying layers. By fixing (i.e. bonding) the position of a turn as it is wound, post-winding slumping (which degrades Shupe bias performance) is avoided.

Thus it is seen that the present invention provides an improved bonded sensor coil for a fiber optic gyroscope. The coil is substantially less subject to the effects of temperature variations than is a conventional potted sensor coil of the filled type. By reducing the volume of bonding material employed, inter-turn void spaces are created. Such void spaces are capable of absorbing thermally-induced expansion of the coil bonding material and the polymer jackets. The combination of a reduction in the volume of bonding material coupled with the creation of expansion-absorbing void spaces presents the gyro designer with numerous options, including the utilization of highly desirable support spools of the paired-end flange type, not available for high accuracy performance gyros that incorporate potted coils of the filled type.

While this invention has been described with reference to its presently preferred embodiment, it is not limited thereto. Rather, this invention is limited only insofar as defined by the following set of patent claims and includes within its scope all equivalents thereof.

What is claimed is:

1. A sensor coil for a fiber optic gyroscope comprising, in combination:
   a) an optical fiber;
   b) said fiber being arranged into a plurality of concentric cylindrical layers with adjacent layers contacting one another;
   c) each of said layers comprising a plurality of turns of said fiber;
   d) said turns being arranged into a predetermined winding pattern with adjacent turns contacting one another;
   e) terminal ends of said wound fiber being remote from the inner layer of said coil;
   f) each of said turns being bonded to one another by a predetermined bonding material at said points of contact; and
   g) said wound coil being mounted between opposed flanges of a spool.

2. A sensor coil as defined in claim 1 wherein said bonding material is of thermoplastic composition characterized by a bond strength to itself and to the jacket of said fiber equivalent to at least 100 p.s.i. in tension.

3. A sensor coil as defined in claim 2 wherein said turns are arranged into a quadrupole winding pattern.

4. A sensor coil as defined in claim 2 wherein said bonding material is selected from the group consisting of polyvinylidene fluoride, polyvinyl butyral and wire enamel.

5. A sensor coil for a fiber optic gyroscope comprising, in combination:
   a) a continuous optical fiber coated with a layer of bonding material and arranged onto a support spool including a pair of end flanges in a plurality of contacting concentric cylindrical layers of turns; and
   b) each turn being arranged into a predetermined winding pattern with adjacent turns contacting one another so that said turns are bonded to one another at said points of contact and void spaces remain between non-contacting portions of said coated fiber.

6. A sensor coil as defined in claim 5 wherein said turns are arranged into a quadrupole winding pattern.

7. A sensor coil as defined in claim 5 wherein said bonding material further comprises:
   a) said bonding material is of thermoplastic composition; and
   b) said thermoplastic is characterized by a bond strength to itself and to the jacket of said fiber equivalent to at least 100 p.s.i. in tension.

8. A sensor coil as defined in claim 7 wherein said bonding material is selected from the group consisting of polyvinylidene fluoride, polyvinyl butyral and wire enamel.

9. A method for forming a sensor coil for a fiber optic gyroscope comprising the steps of:
   a) coating an optical fiber with a layer of predetermined bonding material of no greater than 10 microns thickness selected from the group consisting of polyvinylidene fluoride, polyvinyl butyral and wire enamel; then
   b) winding said optical fiber into a predetermined gyro coil pattern upon a spool including opposed end flanges; and
   c) curing said bonding material whereby contacting portions of turns of said wound fiber are bonded to one another and void spaces remain between said bonded portions.

* * * * *